May 8, 1923.
J. E. HAMLIN
1,454,735
TREE FELLING MACHINE
Filed Oct. 29, 1921
3 Sheets-Sheet 1
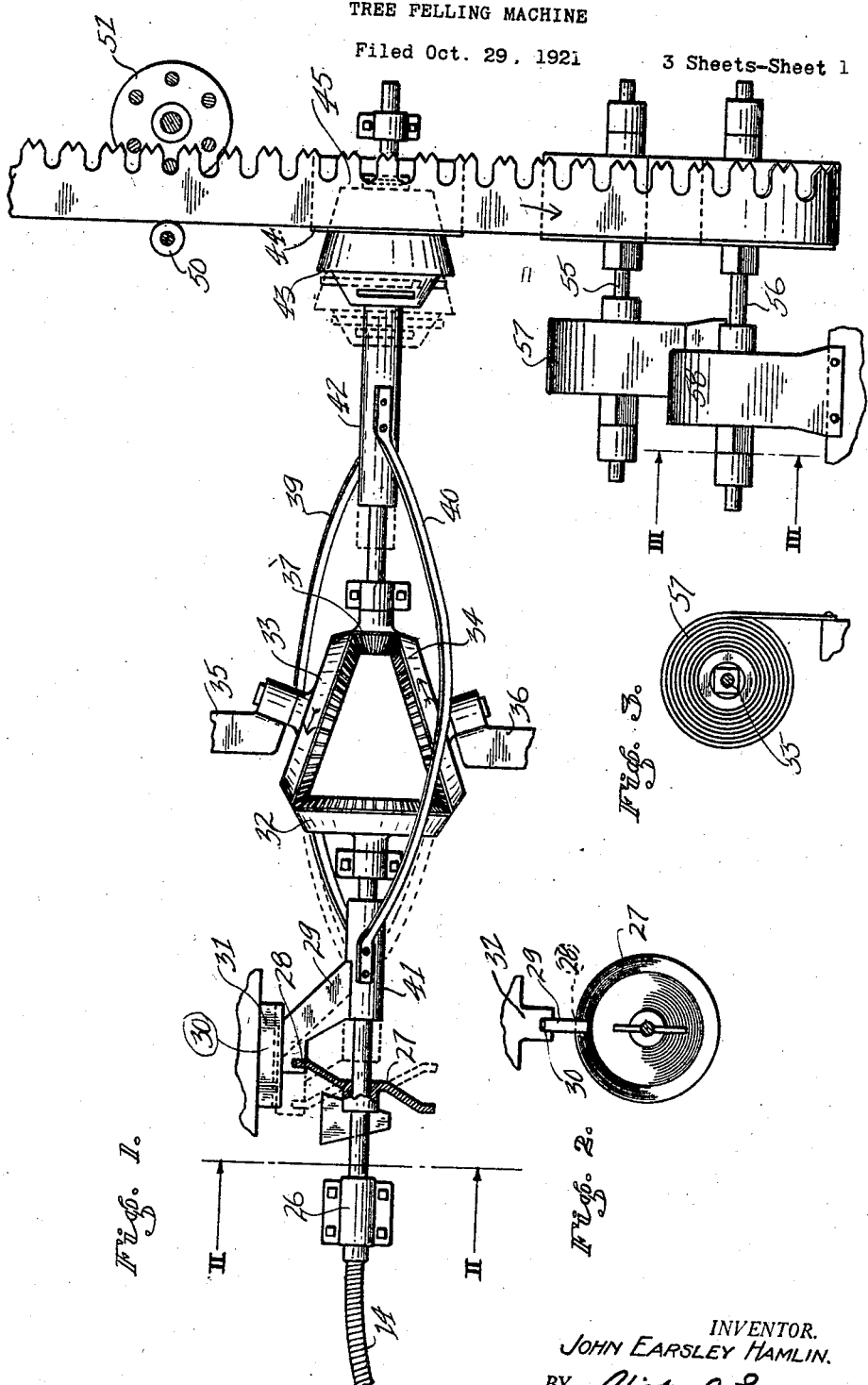
INVENTOR.
JOHN EARSLEY HAMLIN.
BY Victor J. Evans
ATTORNEYS.

May 8, 1923.

J. E. HAMLIN 1,454,735

TREE FELLING MACHINE

Filed Oct. 29, 1921

3 Sheets-Sheet 2

INVENTOR.
JOHN EARSLEY HAMLIN.
BY Victor J. Evans
ATTORNEYS.

May 8, 1923.
J. E. HAMLIN
1,454,735
TREE FELLING MACHINE
Filed Oct. 29, 1921
3 Sheets-Sheet 3
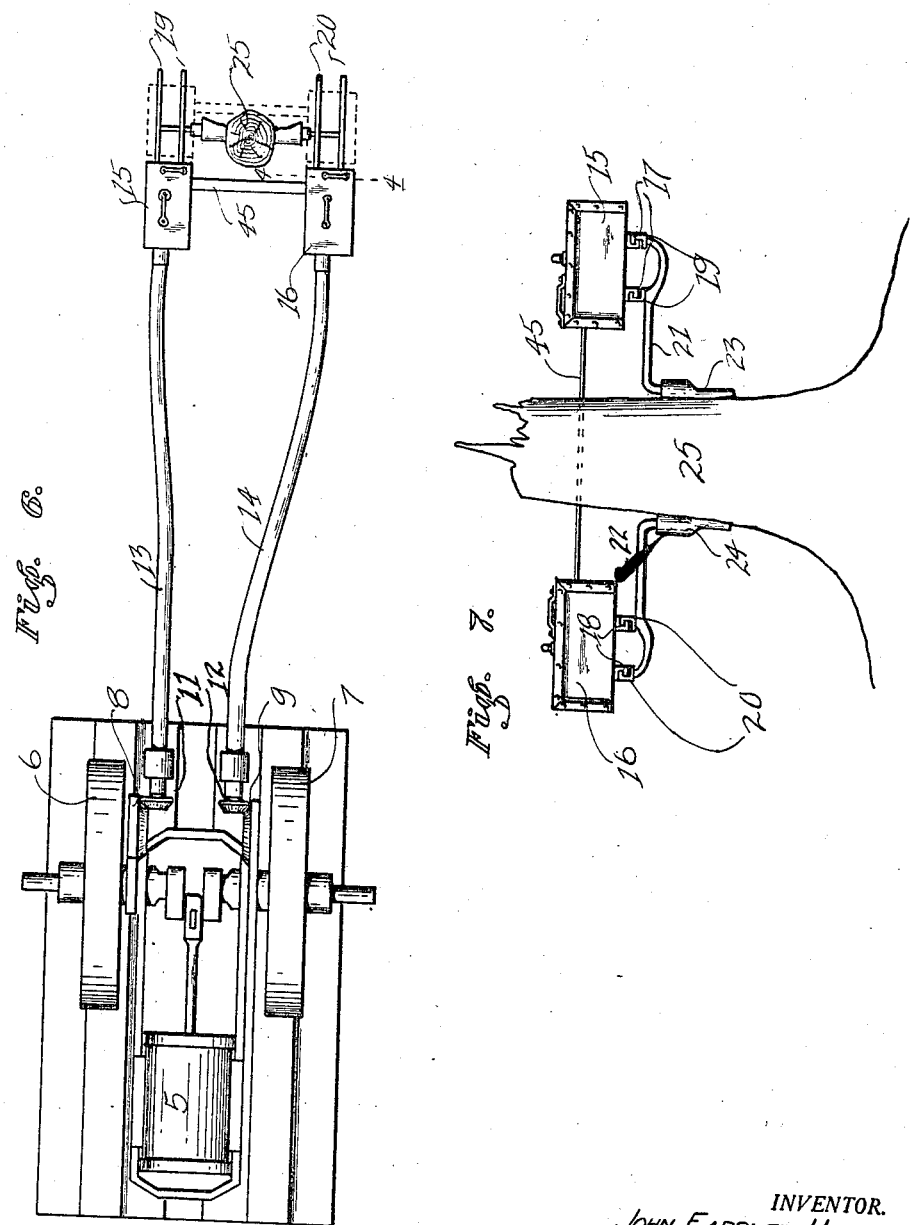
INVENTOR.
JOHN EARSLEY HAMLIN.
BY Victor J. Evans
ATTORNEYS.

Patented May 8, 1923.

1,454,735

UNITED STATES PATENT OFFICE.

JOHN EARSLEY HAMLIN, OF WEED, CALIFORNIA.

TREE-FELLING MACHINE.

Application filed October 29, 1921. Serial No. 511,381.

*To all whom it may concern:*

Be it known that I, JOHN EARSLEY HAMLIN, a citizen of the United States, residing at Weed, in the county of Siskiyou and State of California, have invented new and useful Improvements in Tree-Felling Machines, of which the following is a specification.

This invention relates to improvements in tree felling devices.

The principal object of this invention is to produce a device which may be moved into proximity to a tree to be cut down, and which will perform the manual labor now incident to the felling of a tree with a hand-saw or with axes.

Another object is to produce a machine which is portable, and one which will conform to all of the well recognized methods used in the felling of a tree.

Another object is to produce a device of this character wherein trees of various sizes may be cut, and one which is readily manipulated by the ordinary woodsman.

Other objects and advantages will be apparent during the course of the following description.

Figure 4:
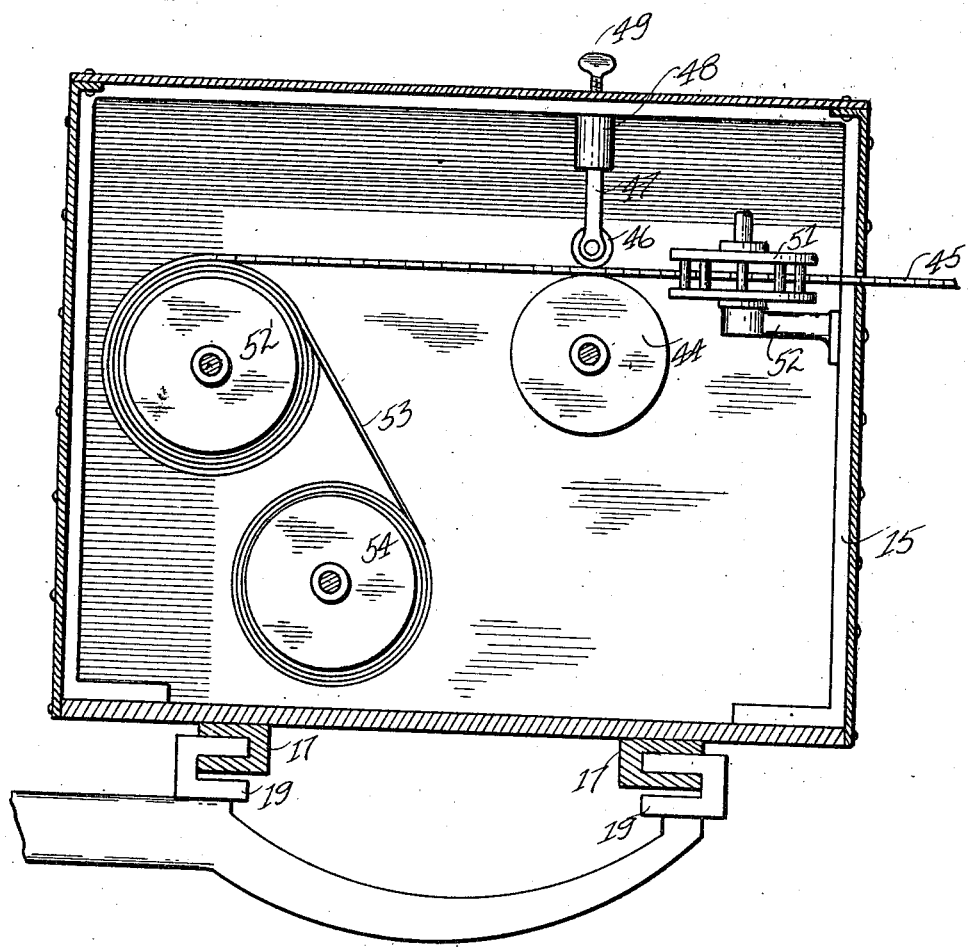
Figure 5:
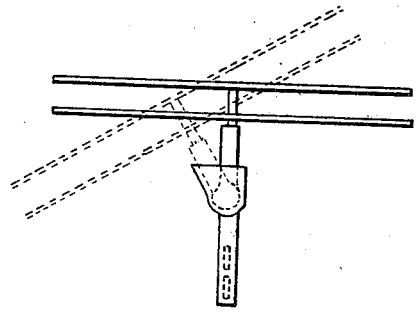

In the accompanying drawings forming a part of this specification, and in which like numerals are employed to designate like parts throughout the same, Fig. 1 is a detail view of the driving mechanism of my tree felling device, Fig. 2 is a fragmentary detail view of a cam disc taken on the line 2—2 of Figure 1, Fig. 3 is a fragmentary detail view taken on the line 3—3 of Figure 1, Figure 4 is a cross-section taken on the line 4—4 of Figure 6, Fig. 5 is a detail view of one of the track-supporting brackets, Fig. 6 is a top plan view of my device as a whole, as applied to a tree, and Fig. 7 is an end elevation of my device showing the manner in which my device is attached to a tree.

In the accompanying drawings wherein for the purpose of illustration is shown a preferred embodiment of my invention, the numeral 5 designates a gasoline engine as a whole having the usual balance wheels 6 and 7. Beveled gears 8 and 9 are suitably secured on the engine 5 so as to rotate therewith and are adapted to mesh with beveled gears 11 and 12. These beveled gears 11 and 12 are secured to flexible shafts 13 and 14, which shafts extend forwardly and enter casings 15 and 16. These casings 15 and 16 are each provided on their own surface with tracks, as shown at 17 and 18. These tracks are U shaped and in turn engage inwardly projecting U shaped tracks 19 and 20, carried upon arms 21 and 22, secured in supplemental brackets 23 and 24 to the base of the tree here designated by the numeral 25. As the construction within the casings 15 and 16 are identical, but one will be described.

By now referring to Figure 1, it will be seen that the shaft 14 extends through a bearing 26 carried in the housing 15 and is provided with an off-set disc 27, which acts as a cam and rides in a slot 28, formed in an arm 29, the same being prevented from rotating through engaging a slot 30 in the block 31 mounted in the housing 15. The shaft 14 carries a beveled gear 32 rigidly attached thereto. This gear, in turn meshes with beveled gears 33 and 34 carried on brackets 35 and 36 secured to the interior of the casing 15.

A beveled gear 37 meshes with the gears 33 and 34, and is mounted upon a shaft 38 in axial alignment with the shaft 14.

Suitable braces 39 and 40 serve to connect a tubular portion 41 of the arm 29 to a tubular portion 42 of a clutch mechanism. This clutch mechanism is familiar to all those versed in the art and will here be designated by the numeral 43, which represents the male member, and the numeral 44 the female member. The outer periphery of this female member 44 is adapted to engage the under surface of the saw 45, and is held in contact therewith through the medium of a pressure roller 46 carried upon a plunger 47. A suitable spring not shown is contained within a cylinder 48, and the tension upon the plunger 47 is regulated through the medium of a thumb screw 49, bearing upon the spring not shown. A roller 50 serves to guide the rear edge of the saw 45, and a suitable cog roller 51 mounted on a bracket 52 serves to retain the edge of the saw in proper alignment.

The saw is of the ordinary band type, with the exception that it is not endless. The free end is attached to a drum 52' as is also a leather belt 53, which belt is also wound upon a drum 54. These drums are attached to shafts 55 and 56, which shafts are, in turn, attached to strong clock springs, as shown at 57 and 58. The free ends of these clock springs are attached to the inner surface of the casing. The brackets 19, upon which the casings 14 and 15 are secured, may be rotated so as to swing partly around the tree, thereby giving the diagonal cut necessary to prevent splitting, and these brackets also permit a tipping of the track to an angle of 30 degrees, which has been found most suitable for under cutting purposes. This phase of the work is well known and needs no further comment. The construction of this bracket is well illustrated in Figure 5.

The operation of my device is, as follows:
Assuming that the same has been attached to the tree, as shown in Figure 6, the motor is started, which results in the two shafts rotating. It must be here noted that the cams 27 on the opposite sides of the device are reversed with respect to each other, and the reason for this will be later seen.

As the shaft 14 revolves, motion will be transmitted to the clutch 44 through the gears 32, 33, 34 and 37. This will cause the saw 45 to move in the direction of the arrow of Figure 1, assuming, for the purpose of argument that most of the saw has been housed in the opposite casing.

As the saw moves in the direction of the arrow, the clock springs will take up the slack and the belt 53 will wind between the convolutions of the saw, which will form a protection for the saw-blade. As the cam 27 turns a half revolution, the parts will move into their dotted position of Figure 1, and at the same time the cam in the opposite casing will have forced its male member of the clutch into the female member of its clutch, with the result that the saw will be moved in an opposite direction to the arrow of Figure 1. At the same time, it will wind its end of the saw upon its drum, with the result that we will have an oscillating movement of the saw between the two casings. As these casings are both mounted upon tracks, it will be seen that the saw can readily be moved into the new wood manually or in any other manner desired.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. In a tree felling device, the combination of power means, flexible shafts extending forwardly from said power means, tracks secured to the tree to be felled, casings slidable on said tracks, a saw extending between said casings, drums within said casings, the ends of said saw being attached to said drums, gearing within each of said casings, a cam on each of said shafts, a clutch mechanism between each of said shafts and said saw, said clutch means being adapted to alternately move said saw, and means for engaging and disengaging said clutches intermittently and alternately with respect to each other.

2. In a tree felling device, the combination of power means, flexible shafts extending forwardly from said power means, tracks secured to the side of the tree to be felled, castings slidable on said tracks, drums mounted within each of said castings, a saw extending between said castings and having an end attached to one of said drums in each of said castings, a belt secured to the remaining drum in each of said castings and having its free end adapted to be wound between the end of said saw and said drum, gears mounted within each of said castings, a cam mounted on each of said shafts, said cams being offset with relation to each other, and a clutch mechanism between each of said shafts and said saw, said clutch means being adapted to alternately move said saw.

In testimony whereof, I affix my signature.

JOHN EARSLEY HAMLIN.